(12) United States Patent
Park et al.

(10) Patent No.: US 8,557,428 B2
(45) Date of Patent: Oct. 15, 2013

(54) BATTERY MODULE AND BATTERY PACK INCLUDING THE SAME

(75) Inventors: Shi-Dong Park, Yongin-si (KR); Tae-Yong Kim, Yongin-si (KR); Charles Kim, Yongin-si (KR); Hyun-Ye Lee, Yongin-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 362 days.

(21) Appl. No.: 12/805,440

(22) Filed: Jul. 30, 2010

(65) Prior Publication Data
US 2011/0159348 A1 Jun. 30, 2011

(30) Foreign Application Priority Data
Dec. 28, 2009 (KR) .................. 10-2009-0131805

(51) Int. Cl.
*H01M 6/42* (2006.01)
(52) U.S. Cl.
USPC ............. 429/151; 429/96; 429/155; 429/148; 429/163; 429/177
(58) Field of Classification Search
USPC .................. 429/96–100, 151–155, 148, 163, 429/176–177
See application file for complete search history.

(56) References Cited

U.S. PATENT DOCUMENTS

| 4,347,294 | A * | 8/1982 | Mejia | 429/151 |
| 6,761,992 | B1 * | 7/2004 | Marukawa et al. | 429/96 |
| 8,168,317 | B2 * | 5/2012 | Yoon et al. | 429/99 |
| 8,268,474 | B2 * | 9/2012 | Kim et al. | 429/149 |
| 2001/0046624 | A1 * | 11/2001 | Goto et al. | 429/99 |
| 2006/0083980 | A1 * | 4/2006 | Choo et al. | 429/120 |
| 2007/0141457 | A1 * | 6/2007 | Amagai | 429/152 |
| 2007/0184339 | A1 * | 8/2007 | Scheucher | 429/99 |
| 2007/0184341 | A1 * | 8/2007 | Yoon et al. | 429/152 |
| 2008/0118823 | A1 * | 5/2008 | Yang et al. | 429/100 |
| 2011/0104543 | A1 * | 5/2011 | Kim et al. | 429/99 |
| 2011/0104552 | A1 * | 5/2011 | Kim et al. | 429/151 |
| 2011/0117409 | A1 * | 5/2011 | Lee et al. | 429/99 |
| 2011/0135992 | A1 * | 6/2011 | Kim et al. | 429/151 |
| 2011/0151308 | A1 * | 6/2011 | Yoon | 429/151 |
| 2011/0151309 | A1 * | 6/2011 | Park et al. | 429/151 |
| 2011/0165451 | A1 * | 7/2011 | Kim et al. | 429/153 |
| 2011/0293971 | A1 * | 12/2011 | Ho et al. | 429/7 |

(Continued)

FOREIGN PATENT DOCUMENTS

KR 10-0649211 B1 11/2006

OTHER PUBLICATIONS

Korean Notice of Allowance in KR 10-2009-0131805, dated Jan. 2, 2012 (Park, et al.).

*Primary Examiner* — Joseph S Del Sole
*Assistant Examiner* — Nahida Sultana
(74) *Attorney, Agent, or Firm* — Lee & Morse, P.C.

(57) ABSTRACT

A battery module for containing a plurality of battery units, the battery module including first and second end plates facing each other; and a side plate, the side plate being for extending across a side of the battery units, and the side plate having a first end coupled to the first end plate and a second end coupled to the second end plate, wherein a work hardening unit is disposed at the second end of the side plate, the work hardening unit being hardened in such a way that the second end of the side plate is bent.

18 Claims, 8 Drawing Sheets

(56) References Cited

U.S. PATENT DOCUMENTS

| | | | |
|---|---|---|---|
| 2011/0293978 A1* | 12/2011 | Kim | 429/99 |
| 2012/0121956 A1* | 5/2012 | Park et al. | 429/99 |
| 2012/0141855 A1* | 6/2012 | Okada et al. | 429/99 |
| 2012/0208069 A1* | 8/2012 | Kim | 429/153 |
| 2012/0214045 A1* | 8/2012 | Yoon | 429/151 |
| 2012/0214046 A1* | 8/2012 | Lim | 429/151 |
| 2012/0270082 A1* | 10/2012 | Kim | 429/87 |
| 2013/0045401 A1* | 2/2013 | Yoon et al. | 429/90 |

\* cited by examiner

BATTERY MODULE AND BATTERY PACK INCLUDING THE SAME

BACKGROUND

1. Field

Embodiments relate to a battery module and a battery pack including the same.

2. Description of the Related Art

In general, secondary batteries are chargeable and dischargeable unlike primary batteries, which are not chargeable. Secondary batteries may be used as energy sources for, e.g., mobile devices, electric vehicles, hybrid electric vehicles, electric bicycles, and uninterruptible power supply devices. Secondary batteries may be used in the form of a single battery or in the form of a battery module in which a plurality of batteries are electrically connected and packed as a single unit, according to the type of an external device in which the secondary batteries are to be used.

Small-sized devices such as mobile phones may be operated for a predetermined amount of time by using power output by and capacity of a single battery. On the other hand, battery modules may be usually used instead of a single battery in devices such as electric vehicles and hybrid electric vehicles consuming large amounts of power for a long time, since power output and capacity of a single battery may be insufficient. An output voltage and an output current of a battery module depends on the number of batteries accommodated therein.

In such battery modules, an assembly structure may be required to systematically bind a plurality of batteries to form a single assembly. The assembly structure may need to provide a coupling force sufficient for binding the plurality of batteries. Lithium ion batteries may be used as the secondary batteries. While lithium ion batteries may maintain a high performance even after repeated charging and discharging, a negative electrode thereof may expand due to lithium ions that are transferred during charging.

SUMMARY

Embodiments are directed to a battery module and a battery pack including the same, which represent advances over the related art.

It is a feature of an embodiment to provide a battery module capable of providing a coupling force that is sufficient to assemble a plurality of batteries in a single assembly.

It is another feature of an embodiment to provide a battery module for inhibiting deterioration of electrical characteristics by preventing expansion of batteries.

At least one of the above and other features and advantages may be realized by providing a battery module for containing a plurality of battery units, the battery module including first and second end plates facing each other; and a side plate, the side plate being for extending across a side of the battery units, and the side plate having a first end coupled to the first end plate and a second end coupled to the second end plate, wherein a work hardening unit is disposed at the second end of the side plate, the work hardening unit being hardened in such a way that the second end of the side plate is bent.

The work hardening unit may be adjacent to a coupling hole in the side plate and may contact a coupling member extending through the coupling hole.

The coupling hole may include a long coupling hole and a circular coupling hole, the circular coupling hole overlapping the long coupling hole by way of a portion of the side plate in which the long coupling hole and circular coupling hole are spaced apart from each other in a lengthwise direction being bent over itself into an overlapping condition.

The long coupling hole may have an oval shape with a major axis along the lengthwise direction of the side plate.

The circular coupling hole may have a substantially circular shape.

The side plate may include a first side plate that extends across a first surface of the battery units; and a second side plate that extends across a second surface of the battery units, the second surface being opposite to the first surface.

Each of the first and second end plates may include a base plate adjacent to the battery units; a first flange unit that is bent from the first side of the base plate in a direction away from the battery units; and a second flange unit that is bent from the second side of the base plate in a direction away from the battery units.

The first side plate may be coupled to the first flange units and the second side plate may be coupled to the second flange units.

At least one of the above and other features and advantages may also be realized by providing a battery module for containing a plurality of battery units, the battery module including first and second end plates facing each other; and a side plate, the side plate having a first end coupled to the first end plate and extending toward the second end plate, surrounding the second end plate, extending toward the first end plate, and being coupled to the first end plate via a second end of the side plate, wherein a work hardening unit is disposed at the second end of the side plate, the work hardening unit being hardened in such a way that the second end of the side plate is bent.

The work hardening unit may be adjacent to a coupling hole in the side plate and may contact a coupling member extending through the coupling hole.

The coupling hole may include a long coupling hole and a circular coupling hole, the circular coupling hole overlapping the long coupling hole by way of a portion of the side plate in which the long coupling hole and circular coupling hole are spaced apart from each other in a lengthwise direction being bent over itself into an overlapping condition.

The long coupling hole may have an oval shape with a major axis along the lengthwise direction of the side plate.

At least one of the above and other features and advantages may also be realized by providing a battery pack including a plurality of battery modules, each battery module including first and second end plates facing each other; a plurality of battery units disposed between the first and second end plates; and a side plate, the side plate being for extending across a side of the battery units and having a first end coupled to the first end plate and a second end coupled to the second end plate, wherein a work hardening unit is disposed at the second end of the side plate, the work hardening unit being hardened in such a way that the second end of the side plate is bent.

The work hardening unit may be adjacent to a coupling hole in the side plate and may contact a coupling member extending through the coupling hole.

The coupling hole may include a long coupling hole and a circular coupling hole, the circular coupling hole overlapping the long coupling hole by way of a portion of the side plate in which the long coupling hole and circular coupling hole are spaced apart from each other in a lengthwise direction being bent over itself into an overlapping condition.

The long coupling hole may have an oval shape with a major axis along the lengthwise direction of the side plate.

The circular coupling hole may have a substantially circular shape.

The side plate may include a first side plate that extends across a first surface of the battery units; and a second side plate that extends across a second surface of the battery units, the second surface being opposite to the first surface.

Each of the first and second end plates may include a base plate adjacent to the battery units; a first flange unit that is bent from the first side of the base plate in a direction away from the battery units; and a second flange unit that is bent from the second side of the base plate in a direction away from the battery units.

The first side plate may be coupled to the first flange units and the second side plate may be coupled to the second flange units.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0131805, filed on Dec. 28, 2009, in the Korean Intellectual Property Office, and entitled: "Battery Module and Battery Pack Comprising the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only layer between the two elements, or one or more intervening elements may also be present. Like reference numerals refer to like elements throughout.

The battery pack of an embodiment described herein may include a plurality of battery modules, each including a plurality of battery units that are arranged in a predetermined direction and electrically connected to each other.

Figure 1:
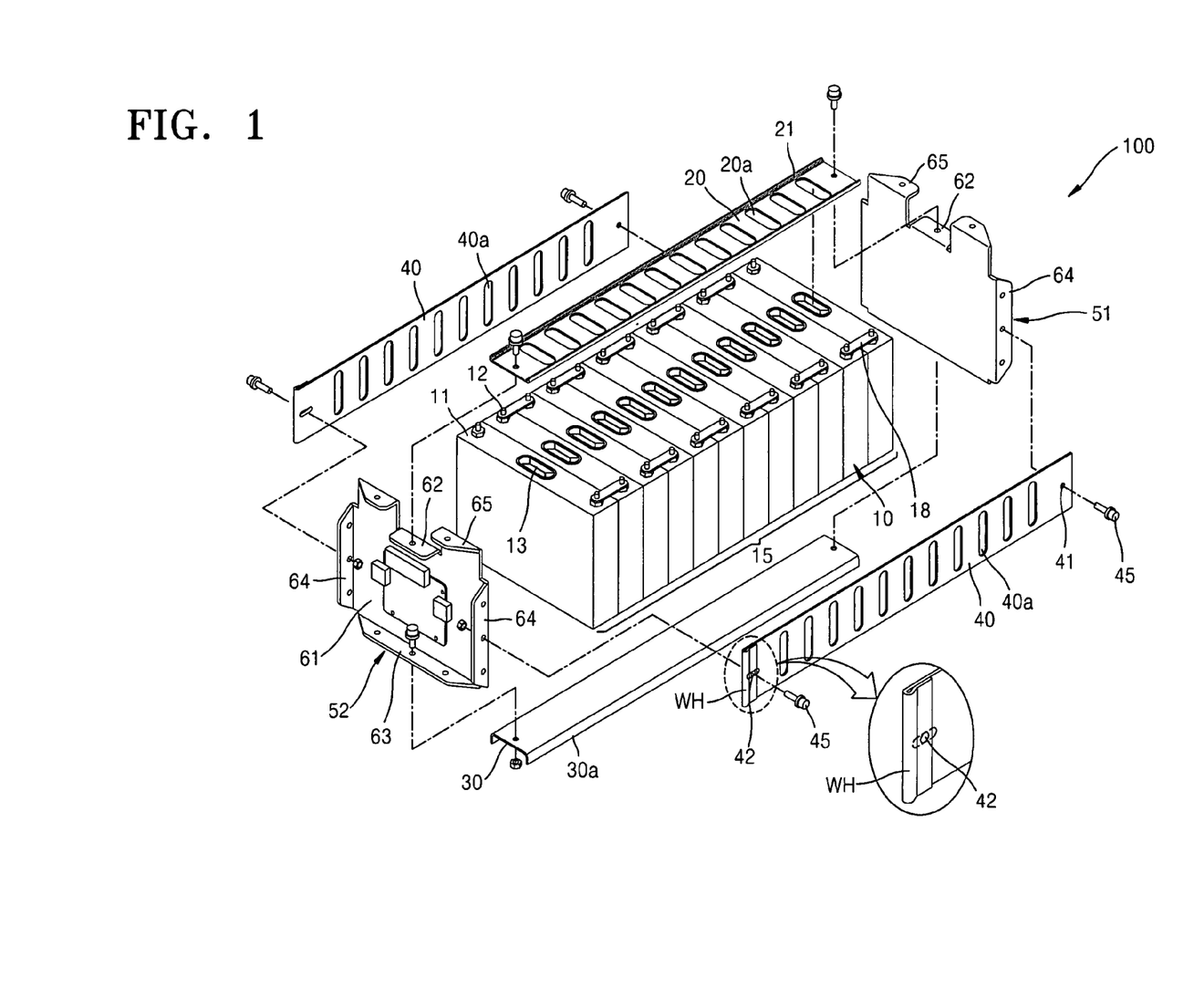
FIG. 1 illustrates an exploded perspective view of a battery module according to an embodiment.
Figure 2:
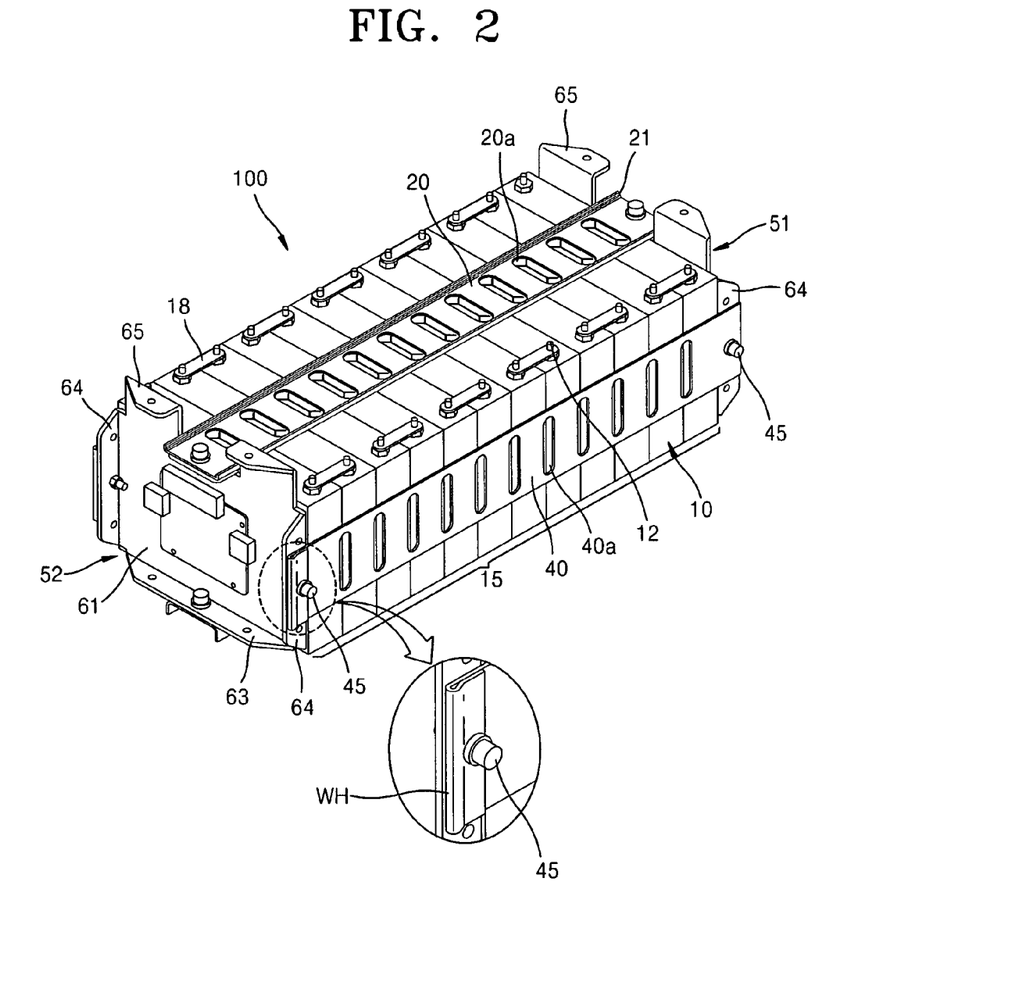
FIG. 2 illustrates an assembled perspective view of the battery module of FIG. 1.

FIG. 1 illustrates an exploded perspective view of a battery module 100. Referring to FIG. 1, the battery module 100 may include a plurality of battery units 10 that are arranged in a row 15, and plates 20, 30, 40, 51, and 52 that surround the battery row 15. In an implementation, the battery units 10 may be arranged in a single row in a predetermined direction. In another implementation, the battery module 100 may have a stacked structure in which the battery units 10 are arranged in multiple rows.

The battery units 10 may each be a secondary battery, e.g., a lithium ion battery. The battery units 10 may be any of various types of secondary batteries, e.g., cylindrical shape secondary batteries, square pillar shape secondary batteries, or polymer secondary batteries, but are not limited thereto. The battery units 10 may each include an electrode assembly (not shown), a case 11, and electrode terminals 12. Each electrode assembly (not shown) may include a positive electrode, a separator, and a negative electrode that are stacked and that may be wound. The cases 11 may accommodate the electrode assemblies; and the electrode terminals 12 may protrude out of the cases 11 in order to allow for an electrical connection between the electrode assemblies and an external circuit. The battery units 10 may be electrically connected to each other in series or in parallel via the electrode terminals 12. For example, the electrode terminals 12 may be connected to each other via bus bars 18. Each case 11 may include a safety vent 13. The safety vents 13 may have a relatively low strength to fracture when an internal pressure in the cases 11 exceeds a predetermined threshold to thereby emit gas contained in the cases 11.

The plates 51 and 52 may include first end plates 51 and second end plates 52 at ends of the battery row 15. Each of the first and second end plates 51 and 52 may have a surface that is in a close contact with an outermost battery unit 10 of the battery row 15. The first and second end plates 51 and 52 may bind the battery units 10 constituting the battery row 15 as a single unit, may inhibit volume expansion of the battery units 10 caused by charging and discharging operations, and may maintain resistance characteristics of the battery units 10, so that deterioration of electrical characteristics of the battery may be beneficially inhibited.

The first and second end plates 51 and 52 may each include a base plate 61 and flange units 62, 63, 64, and 65 that are bent at edges of the base plate 61. The base plates 61 may each have an area that is sufficient to cover an external surface of the battery units 10.

The flange units 62, 63, 64, and 65 may be bent at edges of the base plates 61 in a direction away from the battery row 15. In this regard, single flange units 63 and 64 may be formed by bending, without cutting, entire right, left, and lower edges of the base plates 61. The flange units 62 and 65 may be separated from each other by cutting upper edges of the base plates 61 and bending the cut edges at different positions so that the bent portions have different heights. The flange units 62, 63, 64, and 65 may function as a coupling unit to facilitate coupling of the first and second end plates 51 and 52 with other members and may be modified in various ways. In addition, the flange units 62, 63, 64, and 65 may reinforce mechanical rigidity of the first and second end plates 51 and 52. The flange units 62, 63, 64, and 65 may include a plurality of binding holes.

The first and second end plates 51 and 52 may be connected to each other via plates 40, which may be side plates. In other words, the side plates 40 may bind the first and second end plates 51 and 52 to each other. The side plates 40 may extend along sides of the battery row 15. First ends of the side plates 40 may be coupled to the first end plate 51 and second ends of the side plates 40 may be coupled to the second end plate 52. The side plates 40 may each have a strip shape that extends along the battery row 15. The first ends of the side plates 40 may each have a first coupling hole 41 through which the side plates 40 and the flange unit 64, bent at right and left edges of the first end plate 51, may be, e.g., screw-coupled, to each other. For example, the side plates 40 and the flange unit 64 may be screw-coupled by overlapping the side plates 40 and the flange unit 64 and coupling them using coupling members 45 through the first coupling holes 41. In an implementation, bolts may be inserted into the first coupling holes 41 and fastened with nuts.

The second ends of the side plates 40 may each have a second coupling hole 42 through which the side plates 40 and the flange unit 64, that is bent at right and left edges of the second end plate 52, may be, e.g., screw-coupled, to each other. The side plates 40 and the flange unit 64 may be screw-coupled by overlapping the side plates 40 and the flange unit 64 and coupling them using coupling members 45 through the second coupling holes 42. In an implementation, bolts may be inserted into the second coupling holes 42 and fastened with nuts.

Work hardening units WH may be formed at the second ends of the side plates 40, which may be adjacent to the second coupling holes 42. For example, the work hardening units WH may have a roll shape at the second ends of the side plates 40. The protruding work hardening units WH may contact the coupling members 45 when the coupling members 45 are inserted into the coupling holes 42. Thus, coupling of the side plates 40 to the second end plate 52 may be strengthened since the work hardening units WH and the coupling members 45 are hooked together. The work hardening units WH may be formed by bending the second ends of the side plates 40 and overlapping the bent portions back onto the side plates 40. The bent portions may have improved mechanical rigidity after they are processed by a work hardening process. Electrical characteristics of the battery units 10 may not be deteriorated since volume expansion of the battery units 10 may be inhibited due to a coupling force applied in the lengthwise direction of the side plates 40. Further, the coupling force of the side plates 40 may be reinforced by forming the work hardening units WH at the second ends of the side plates 40.

The side plates 40 may each have at least one heat dissipation hole 40a. For example, a plurality of the heat dissipation holes 40a may be disposed along the lengthwise direction of the side plates 40 at equal intervals. Since the heat dissipation holes 40a may allow contact between the battery units 10 and external air, heat generated during operation of the battery units 10 may quickly be dissipated from the battery units 10.

The plate 30 may be a lower plate under the battery row 15. The lower plate 30 may be connected to lower portions of the first and second end plates 51 and 52 across a bottom of the battery row 15. The lower plate 30 may include bending units 30a that are bent from side ends thereof to face each other. The lower plate 30 may support the total weight of the battery module 100 and bending rigidity thereof may be reinforced due to the bending units 30a.

The lower plate 30 and the flange units 63 bent from the lower edges of the first and second end plates 51 and 52 may be, e.g., screw-coupled. The lower plate 30 and the flange units 63 may overlap each other and positions of coupling holes may correspond to each other and may then be screw-coupled using coupling members, e.g., bolts and nuts.

The plate 20 may be an upper plate disposed on the battery row 15. The upper plate 20 may be connected to upper portions of the first and second end plates 51 and 52 across a top of the battery row 15. The upper plate 20 may have bending units 21 that are bent from side ends thereof to face each other.

The upper plate 20 may have openings 20a along a lengthwise direction of the upper plate 20 so as to correspond to the safety vents 13 of the battery units 10. The upper plate 20 and the flange units 62, bent from the upper edges of the first and second end plates 51 and 52, may be, e.g., screw-coupled. The upper plate 20 and the flange units 62 may overlap each other and positions of coupling holes may correspond to each other, and may then be screw-coupled using coupling members, e.g., bolts and nuts.

Figure 3A:
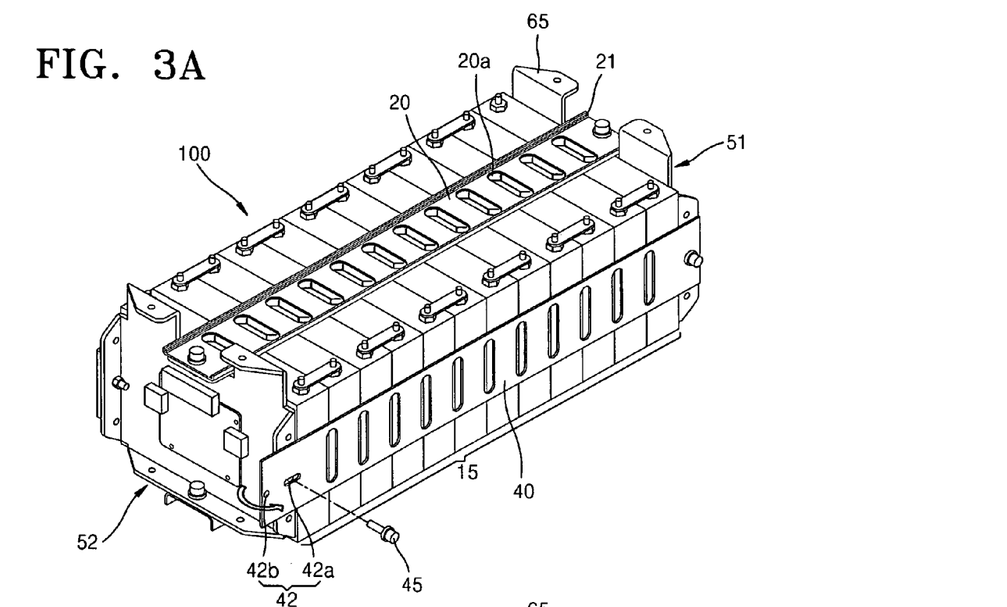
FIGS. 3A and 3B illustrate perspective views of a battery module showing formation of a work hardening unit.
Figure 3B:
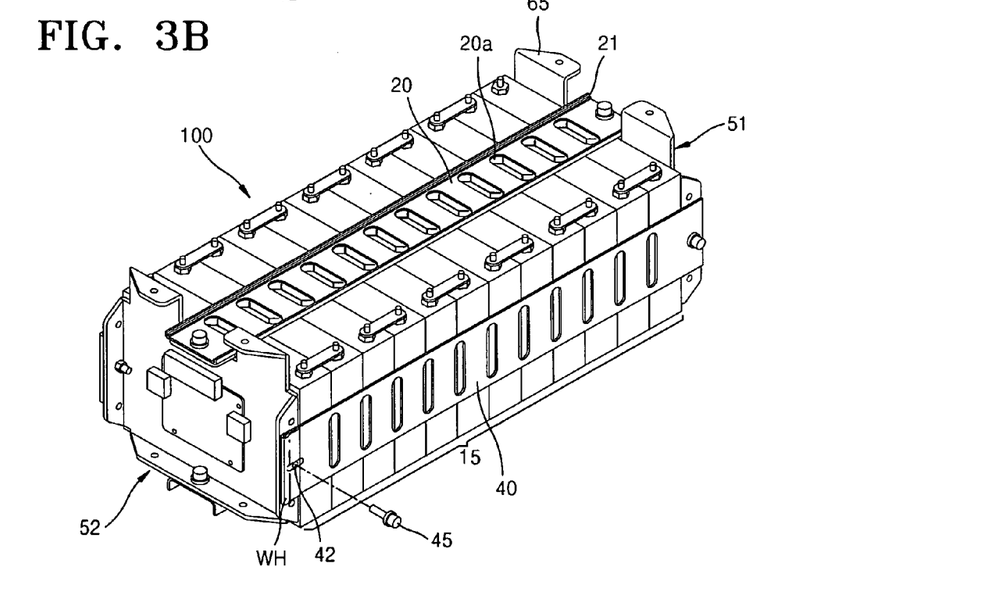

FIGS. 3A and 3B illustrate perspective views of a battery module showing the formation of the work hardening units WH of the side plates 40. Referring to FIG. 3A, the first end of one side plate 40 may be fixed to the first end plate 51 and may extend toward the second end plate 52. A long coupling hole 42a and a circular coupling hole 42b may be disposed at the second end of the side plate 40 and spaced apart from each other by a predetermined distance in the lengthwise direction of the side plate 40.

Referring to FIGS. 3A and 3B, the second end of the side plate 40 may be bent into a roll shape to overlap the circular coupling hole 42b over the long coupling hole 42a. Accordingly, the work hardening unit WH bent into a roll shape may be formed. The work hardening unit WH may have a flat-folded shape by applying compression, i.e., pressure, thereto. In this regard, a position of the circular coupling hole 42b overlapping the long coupling hole 42a may be changed along the lengthwise direction of the side plate 40 according to the bending of the side plate 40 and a manufacturing tolerance. Here, the long coupling hole 42a may have a shape extending in the lengthwise direction of the side plate 40 so that the circular coupling hole 42b may easily correspond to the long coupling hole 42a.

Figure 4:
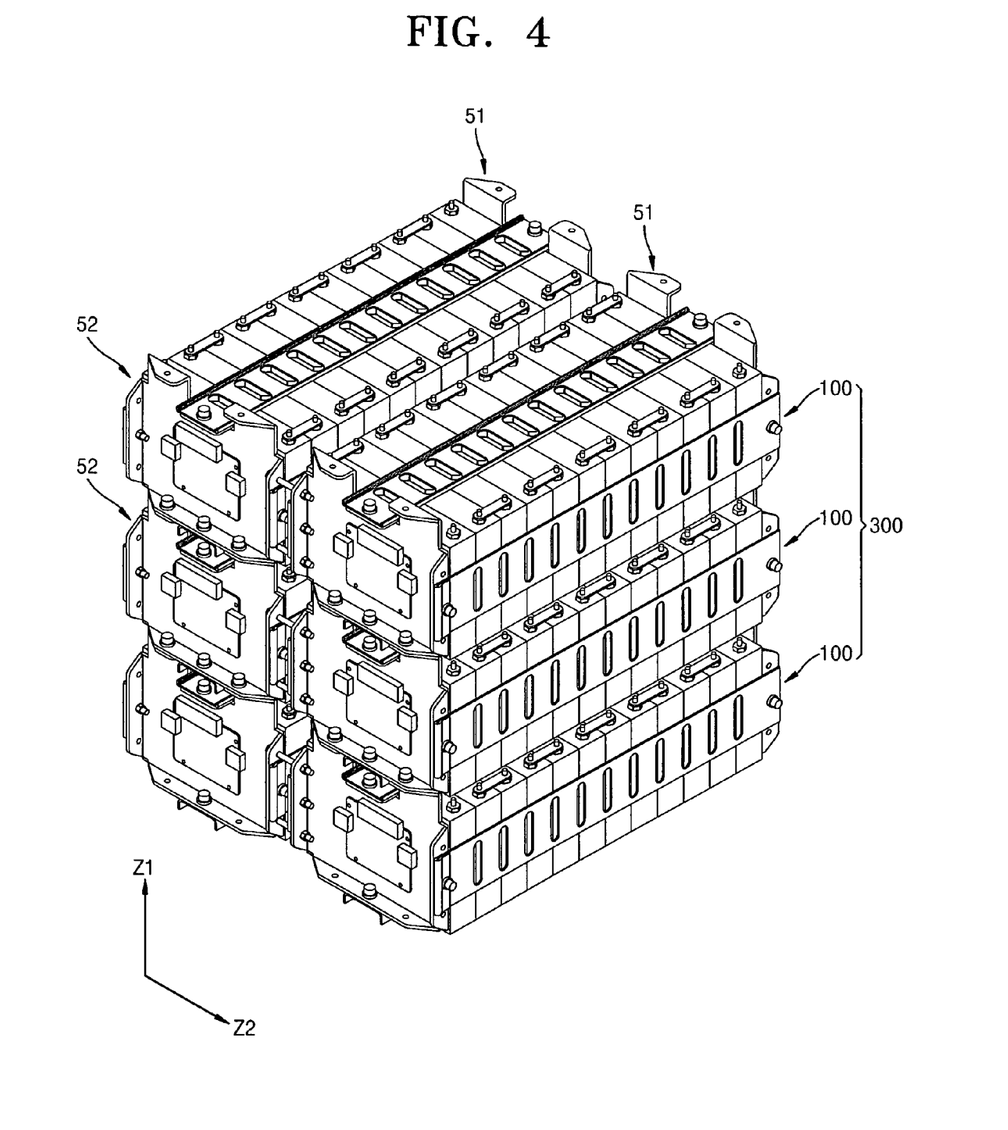
FIG. 4 illustrates a perspective view of a battery pack according to an embodiment.

FIG. 4 illustrates a perspective view of a battery pack 300 including a plurality of battery modules 100 as shown in FIG. 3B. Referring to FIG. 4, the battery pack 300 may be an assembly of a plurality of battery modules 100 that are stacked in a vertical direction Z1 and a horizontal direction Z2. The number of the battery modules 100 constituting the battery pack 300 may be determined in consideration of charging and discharging current and capacity; and may be electrically connected to each other in series or in parallel.

Figure 5:
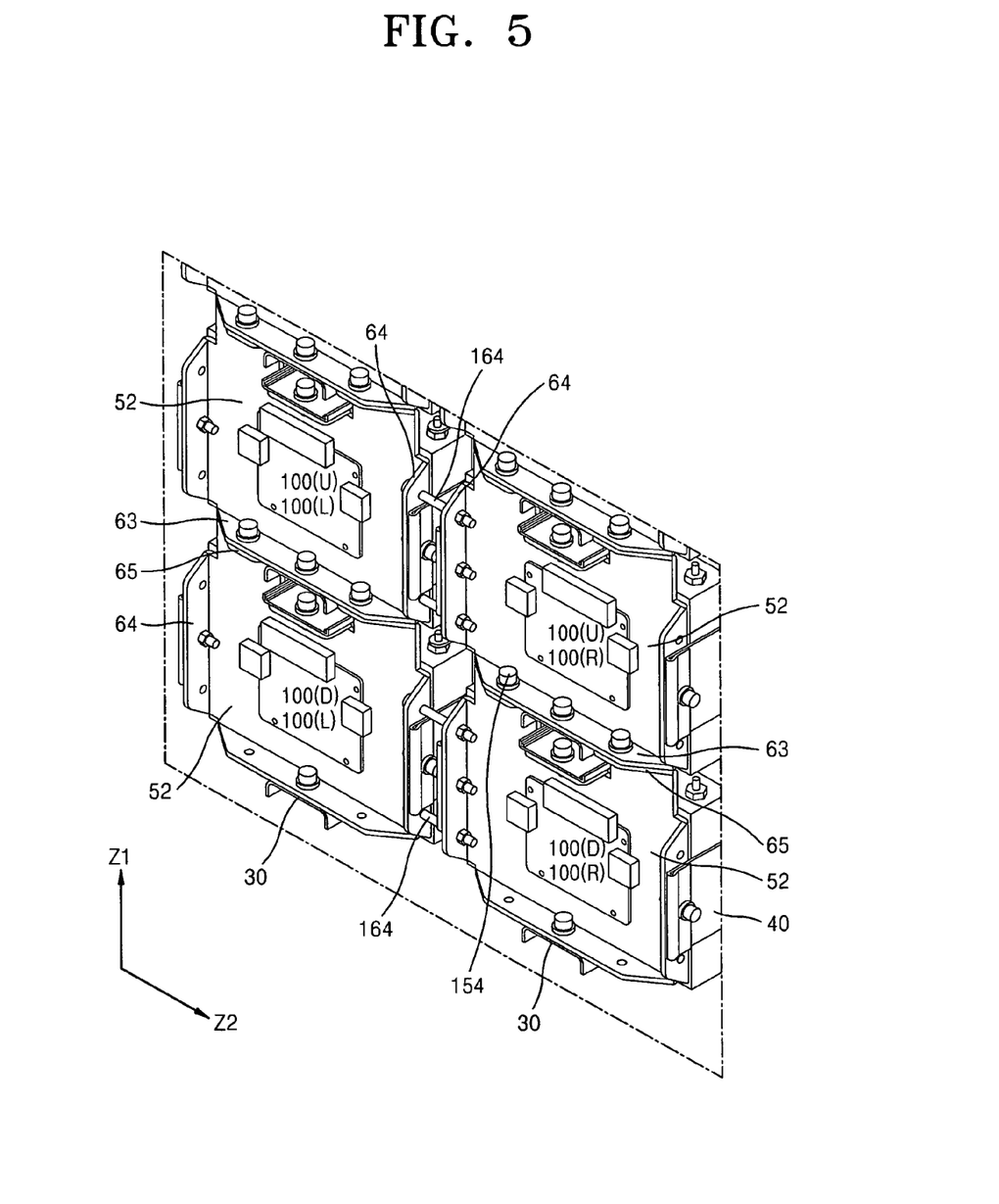
FIG. 5 illustrates an enlarged view of an end plate of FIG. 4.

Adjacent battery modules 100 may be coupled to each other by coupling the end plates 51 and 52, which are outermost layers of the battery module 100. FIG. 5 illustrates an enlarged view of the end plates 51 and 52 of FIG. 4. U, D, L, and R in brackets used herein respectively indicate relative positions of the battery modules 100, i.e., upper (U), lower (D), left (L), and right (R). For example, the battery module 100 disposed at the upper left position may be indicated by 100(U) and 100 (L).

The upper battery modules 100(U) and the lower battery modules 100(D) may be aligned in the vertical direction Z1. The lower flange units 63 may be disposed at lower edges of the upper battery modules 100(U); and the upper flange units 65 may be disposed at upper edges of the lower battery modules 100(D). The lower flange units 63 of the upper battery modules 100(U) and the upper flange units 65 of the lower battery modules 100(D) may be aligned to overlap each other and to align the coupling holes thereof. Then, the upper and lower battery modules 100(U) and 100(D) may be coupled using coupling members 154 through the coupling holes, e.g., by inserting bolts into the coupling holes and fastening the bolts with nuts. In this regard, the lower flange units 63 of the upper battery modules 100(U) and the upper flange units 65 of the lower battery modules 100(D) may have an interfacial contact therebetween on at least one portion. Via the interfacial contact between the lower flange units 63 and the upper flange units 65, the weight of the upper battery modules 100(U) may be sustained by the lower battery modules 100(D).

The left battery modules 100(L) and the right battery modules 100(R) may be aligned in the horizontal direction Z2. The flange units 64 may be disposed at right edges of the left battery modules 100(L) and left edges of the right battery modules 100(R) and may be disposed to face each other. Here, the flange units 64 of the left battery modules 100(L) and the right battery modules 100(R) may overlap each other and coupling holes thereof may correspond to each other. Then, the left and right battery modules 100(L) and 100(R) may be coupled using coupling members 164 through the coupling holes, e.g., by inserting bolts into the coupling holes and fastened with nut.

As described above, a plurality of battery modules 100 that are aligned in the vertical direction Z1 and the horizontal direction Z2 may be assembled as a single battery pack 300 by coupling the end plates 51 and 52. In this regard, the coupling of the end plates 51 and 52 may be conducted by using a mechanical coupling method using, e.g., bolts and nuts, or a welding method.

Figure 6:
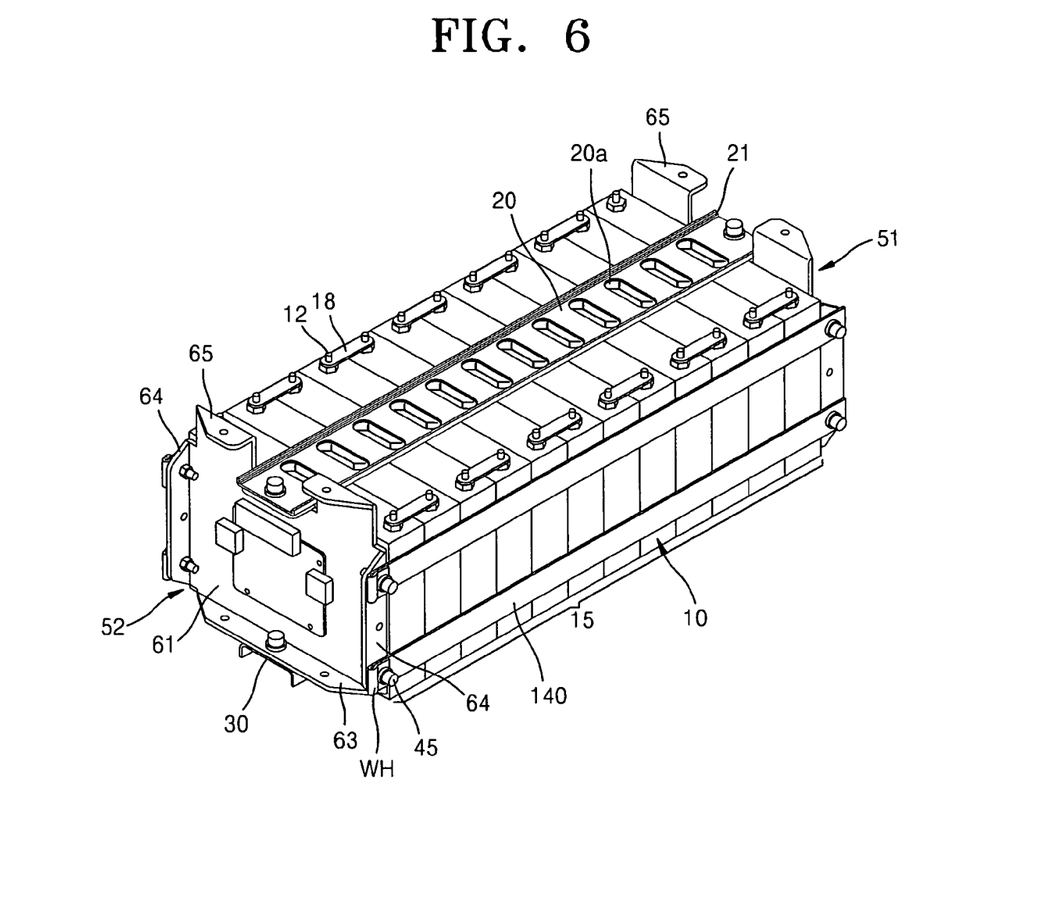
FIG. 6 illustrates a perspective view of a battery module according to another embodiment.

FIG. 6 illustrates a perspective view of a battery module according to another embodiment. Referring to FIG. 6, the first and second end plates 51 and 52 may be disposed at the outermost layers of the battery row 15; and side plates 140 that are disposed across sides of the battery row 15 may be coupled to the first and second end plates 51 and 52. The side plates 140 may extend along sides of the battery row 15. First ends of the side plates 140 may be coupled to the first end plate 51; and second ends of the side plates 140 may be coupled to the second end plate 52. At least two side plates 140 may be disposed in parallel and spaced apart by a predetermined interval. The side plates 140 that are aligned in multi rows, i.e., in parallel, may bind the first and second end plates 51 and 52 by double coupling so that expansion of the battery row 15 that is interposed between the first and second end plates 51 and 52 may be inhibited. Thus, deterioration of electrical characteristics of the battery caused by volume expansion of the battery units 10 may be efficiently inhibited.

The side plates 140 may have first ends thereof coupled to the first end plate 51 and second ends thereof coupled to the second end plate 52 and may have a strip shape. Work hardening units WH that are bent into a roll shape may be formed at the second ends of the side plates 140. The protruding work hardening units WH may contact the coupling members 45; and coupling strength between the work hardening units WH and the coupling members 45 may increase since the work hardening units WH and the coupling members 45 are hooked together. The work hardening units WH may be formed by bending the second ends of the side plates 140 and overlapping the bent portions onto the side plates 140. The bent work hardening units WH may have high mechanical rigidity. Thus, coupling strength thereof to the side plates 140 may be improved.

Figure 7:
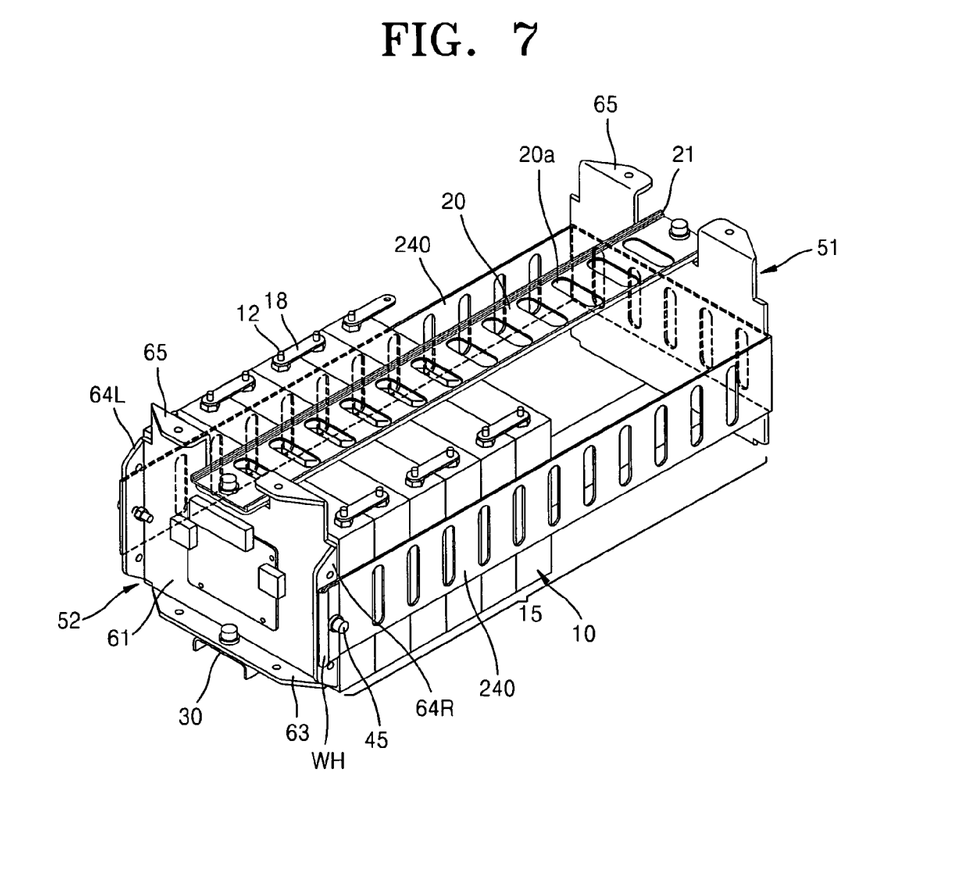
FIG. 7 illustrates a perspective view of a battery module according to yet another embodiment.
Figure 8:
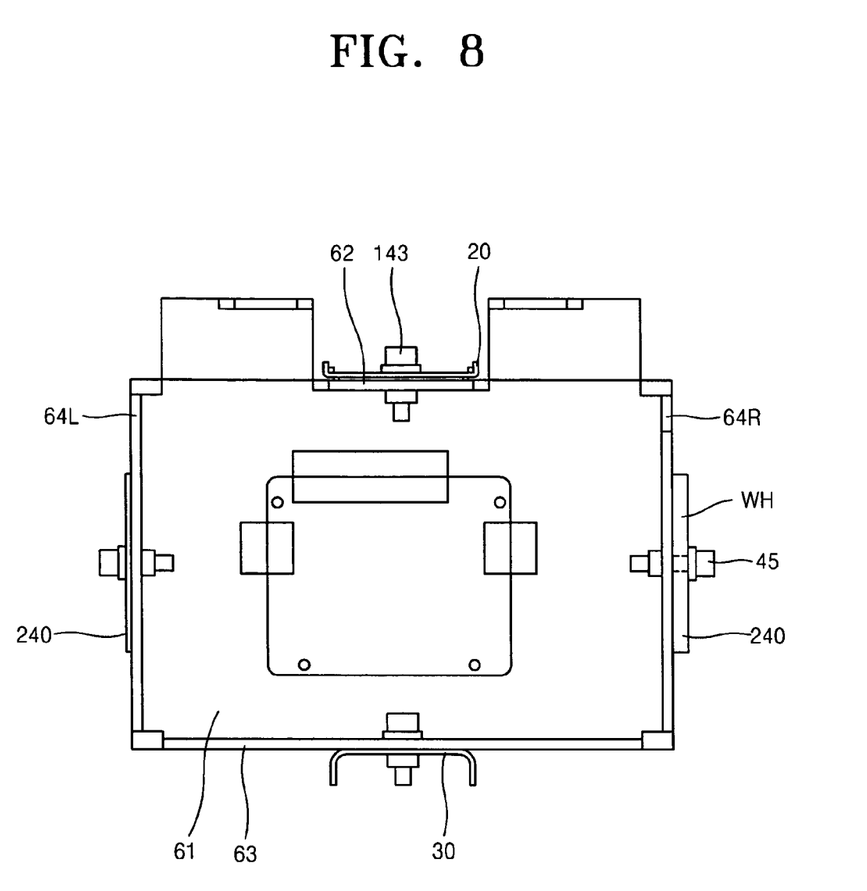
FIG. 8 illustrates the battery module of FIG. 7 from an end plate side.

FIG. 7 illustrates a perspective view of a battery module according to yet another embodiment. FIG. 8 illustrates the battery module of FIG. 7 from an end plate side. Referring to FIGS. 7 and 8, the first and second end plates 51 and 52 may be disposed at the outermost layers of the battery units 10 arranged in a row 15. Then, the first and second end plates 51 and 52 and the battery row 15 may be bound by a side plate 240 that surround them. The second end plate 52 may have a left flange unit 64L and a right flange unit 64R at side ends thereof. For example, one end of the side plate 240 may be coupled to the left flange unit 64L of the second end plate 52; and another end of the side plate 240 may be coupled to the right flange unit 64R of the second end plate 52. The side plate 240 may extend from the one end that is coupled to the left flange unit 64L of the second end plate 52 toward the first end plate 51, may surround the first end plate 51, may extend toward the second end plate 52, and may be coupled to the right flange unit 64R of the second end plate 52.

Here, a work hardening unit WH that is bent into a roll shape may be formed at the end of the side plate 240 that is coupled with the right flange unit 64R. The protruding work hardening unit WH may contact one coupling member 45 that fixes the side plate 240; and the coupling strength of the side plate 240 may increase since the work hardening unit WH and the coupling member 45 are hooked each other.

Since the first and second end plates 51 and 52 and the battery row 15 may be coupled using the single side plate 240 in a single process, the number of parts and processes required to assemble the parts may be advantageously reduced.

According to the embodiments, when a plurality of batteries are coupled to each other to form a single battery module, portions providing binding or coupling forces may be bent and cured by a work hardening process to improve the coupling strength. Thus, mechanical rigidity of the entire battery module may be improved. Furthermore, since the batteries aligned in a row may be bound with a strong coupling force, volume expansion of the batteries may be inhibited and electrical characteristics may not be deteriorated.

In particular, in a battery pack including a plurality of secondary batteries, if each battery slightly expands, an entire volume of the battery pack may increase by about 5 to 10%. The battery pack of an embodiment may prevent serious deformation thereof; and electrical resistance of unit batteries may thereby be prevented from increasing. Thus, electrical characteristics of the battery pack may be maintained.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module for containing a plurality of battery units, the battery module comprising:
   first and second end plates facing each other; and
   a side plate, the side plate being for extending across a side of the battery units, and the side plate having a first end coupled to the first end plate and a second end coupled to the second end plate,
   wherein a work hardening unit is disposed at the second end of the side plate, the work hardening unit being hardened in such a way that a portion of the second end of the side plate is bent over itself into an overlapping condition; wherein each of the first and second end plates include: a base plate adjacent to the battery units; a first flange unit that is bent from a first side of the base plate in a direction away from the battery units; and a second flange unit that is bent from a second side of the base plate in a direction away from the battery units.

2. The battery module as claimed in claim 1, wherein the work hardening unit is adjacent to a coupling hole in the side plate and contacts a coupling member extending through the coupling hole.

3. The battery module as claimed in claim 2, wherein the coupling hole includes a long coupling hole and a circular coupling hole, the long coupling hole and the circular coupling hole being spaced apart from each other along a lengthwise direction of the side plate, the circular coupling hole overlapping the long coupling hole by way of the portion of the side plate in which the long coupling hole and circular coupling hole are spaced apart from each other in the lengthwise direction being bent over itself into the overlapping condition.

4. The battery module as claimed in claim 3, wherein the long coupling hole has an oval shape with a major axis along the lengthwise direction of the side plate.

5. The battery module as claimed in claim 3, wherein the circular coupling hole has a substantially circular shape.

6. The battery module as claimed in claim 1, wherein the side plate includes:
   a first side plate that extends across a first surface of the battery units; and
   a second side plate that extends across a second surface of the battery units, the second surface being opposite to the first surface.

7. The battery module as claimed in claim 1, wherein the first side plate is coupled to the first flange units and the second side plate is coupled to the second flange units.

8. A battery module for containing a plurality of battery units, the battery module comprising:
   first and second end plates facing each other; and
   a side plate, the side plate:
      having a first end coupled to the first end plate and extending toward the second end plate,
      surrounding the second end plate,
      extending toward the first end plate, and
      being coupled to the first end plate via a second end of the side plate,
   wherein a work hardening unit is disposed at the second end of the side plate, the work hardening unit being hardened in such a way that a portion of the second end of the side plate is bent over itself into an overlapping condition; wherein each of the first and second end plates include: a base plate adjacent to the battery units; a first flange unit that is bent from a first side of the base plate in a direction away from the battery units; and a second flange unit that is bent from a second side of the base plate in a direction away from the battery units.

9. The battery module as claimed in claim 8, wherein the work hardening unit is adjacent to a coupling hole in the side plate and contacts a coupling member extending through the coupling hole.

10. The battery module as claimed in claim 9, wherein the coupling hole includes a long coupling hole and a circular coupling hole, the long coupling hole and the circular coupling hole being spaced apart from each other along a lengthwise direction of the side plate, the circular coupling hole overlapping the long coupling hole by way of the portion of the side plate in which the long coupling hole and circular coupling hole are spaced apart from each other in the lengthwise direction being bent over itself into the overlapping condition.

11. The battery module as claimed in claim 10, wherein the long coupling hole has an oval shape with a major axis along the lengthwise direction of the side plate.

12. A battery pack, comprising:
   a plurality of battery modules, each battery module including:
   first and second end plates facing each other;
   a plurality of battery units disposed between the first and second end plates; and
   a side plate, the side plate being for extending across a side of the battery units and having a first end coupled to the first end plate and a second end coupled to the second end plate,
   wherein a work hardening unit is disposed at the second end of the side plate, the work hardening unit being hardened in such a way that a portion of the second end of the side plate is bent over itself into an overlapping condition; wherein each of the first and second end plates include: a base plate adjacent to the battery units; a first flange unit that is bent from a first side of the base plate in a direction away from the battery units; and a second flange unit that is bent from a second side of the base plate in a direction away from the battery units.

13. The battery pack as claimed in claim 12, wherein the work hardening unit is adjacent to a coupling hole in the side plate and contacts a coupling member extending through the coupling hole.

14. The battery pack as claimed in claim 13, wherein the coupling hole includes a long coupling hole and a circular coupling hole, the long coupling hole and the circular coupling hole being spaced apart from each other along a lengthwise direction of the side plate, the circular coupling hole overlapping the long coupling hole by way of the portion of the side plate in which the long coupling hole and circular coupling hole are spaced apart from each other in the lengthwise direction being bent over itself into the overlapping condition.

15. The battery pack as claimed in claim 14, wherein the long coupling hole has an oval shape with a major axis along the lengthwise direction of the side plate.

16. The battery pack as claimed in claim 14, wherein the circular coupling hole has a substantially circular shape.

17. The battery pack as claimed in claim 12, wherein the side plate includes:
   a first side plate that extends across a first surface of the battery units; and
   a second side plate that extends across a second surface of the battery units, the second surface being opposite to the first surface.

18. The battery pack as claimed in claim 17, wherein the first side plate is coupled to the first flange units and the second side plate is coupled to the second flange units.

* * * * *